United States Patent

Neuhauser et al.

[11] Patent Number: 5,431,191
[45] Date of Patent: Jul. 11, 1995

[54] MECHANICALLY INTERLOCKED LAYERED TUBE WITH CONTROLLED FLEXIBILITY

[75] Inventors: Ryan Neuhauser, Worthington; Douglas Colby, Hampden, both of Mass.

[73] Assignee: Titeflex Corporation, Springfield, Mass.

[21] Appl. No.: 31,592

[22] Filed: Mar. 15, 1993

[51] Int. Cl.⁶ .............................................. F16L 11/14
[52] U.S. Cl. .................................. 138/137; 138/103; 138/109; 138/118; 138/121; 138/147; 174/47; 361/215
[58] Field of Search ............... 138/137, 141, 140, 121, 138/147, 149, 103, DIG. 3, 125, 109, 177, 118; 174/47, 68.3; 361/215

[56] References Cited

U.S. PATENT DOCUMENTS

| | | | |
|---|---|---|---|
| 2,624,366 | 1/1953 | Pugh | 138/137 |
| 2,690,769 | 10/1954 | Brown | 138/125 |
| 3,109,461 | 11/1963 | Wolff et al. | 138/137 |
| 3,828,112 | 8/1974 | Johansen et al. | 174/47 |
| 4,261,390 | 4/1981 | Belofsky | 138/137 |
| 4,312,383 | 1/1982 | Kleykamp | 174/47 |
| 4,970,351 | 11/1990 | Kirlin | 174/68.3 |
| 5,170,011 | 12/1992 | Martucci | 138/137 |

FOREIGN PATENT DOCUMENTS

| | | | |
|---|---|---|---|
| 0010751 | 5/1980 | European Pat. Off. . | |
| 2451533 | 10/1980 | France . | |
| 1223207 | 8/1966 | Germany | 361/215 |

*Primary Examiner*—James E. Bryant, III
*Attorney, Agent, or Firm*—Louis Bernat

[57] ABSTRACT

An all plastic (preferably fluorocarbon) automotive hose has great strength relative to the light weight thereof. The hose is made of an inner layer which has a preferably circumferential grooves on an outer wall and an electrically conductive surface on an inner wall. An outer jacket is extruded over the outer wall with the jacket material filling all grooves to provide a mechanical interlocking between the inner layer and the jacket. The cross section of the grooves is selected on a basis of the amount of mechanical movement desired between the inner layer and jacket. Some grooves provide uniform flexibility, some provide progressively greater resistance to bending, and some provide a differential resistance to bending—more resistance in one direction than in another direction.

6 Claims, 1 Drawing Sheet

MECHANICALLY INTERLOCKED LAYERED TUBE WITH CONTROLLED FLEXIBILITY

This invention relates to tubes and hoses with controlled flexibility, especially—but not exclusively—for use in the automotive industry, and more particularly to lightweight tubes and hoses which are highly resistant to chemical degradation or an electrical charge accumulation.

Reference is made to U.S. Pat. No. 3,166,688 for a description of polytetrafluoroethylene having electrical conductive characteristics, which is especially useful in draining away static electrical charges. The teachings of this patent may be used in the inventive hose, although many different fluorocarbon plastic materials may be used.

Hoses of the described type are subject to degradation from the chemicals which they convey, to an accumulation of electrical charges responsive to an internal fluid flow, and to kinking and other bending deformations. Also, on automotive vehicles, they often encounter vibration, swinging, and whipping. The invention is designed not only to overcome these and similar problems, but also to provide principles which have application to hoses used in many other areas.

When problems of this type have been solved in the past by providing multilayer hoses, a common trouble has related to a difficulty in getting the various kinds of materials to bond or otherwise be joined together and in preventing them from delaminating. In a multilayer hose of the described type, the outer jacket could work its way off the inner or core layer unless the two layers are somehow constrained. These problems result from the chemical inertness of the materials lining the hoses and from the differences in the relative weights of the materials.

Beyond these problems, a desire is to make a mechanically strong hose, which is as light as possible, considering the job which it is to do. One problem with PTFE is that it often has too little strength on a "pull" test, often less than 10-pounds when a "pull" strength in the order of perhaps 100-pounds is desired. This is important to meet Federal vehicle safety standards. Different hoses may require different degrees of flexibility or even one degree of flexibility when bent in one manner and other degree of flexibility when bent in another manner.

The need for mechanical strength also requires an outer jacket which resists abrasion. When flexibility becomes too great the hose is given to kinking; therefore, another goal is to provide a hose which is highly flexible without simultaneously kinking and bending. Still another object is to prevent obstructions to internal fluid flow, such as may occur in convoluted hoses that are often used in these described conditions.

Accordingly, an object of the invention is to provide new and improved hoses of the described type, especially for automotive purposes. Here, an object of the invention is to provide a hose having an internal fluorocarbon polymer, corrosion resistant liner surrounded by a relatively thick outer jacket or layer of suitable elastomeric or plastic material. In this connection, an object is to provide a good mechanical joining between the internal liner and the outer jacket.

Another object of the invention is to provide an electrically conductive inner liner to carry away electrical charges that may be generated by the internal fluid flow.

In keeping with an aspect of the invention, these and other objects are accomplished by an extruded fluorocarbon inner hose liner with preferably circumferential grooves on its exterior wall. These grooves may be either continuous or intermittent around the circumference. The grooves receive and mechanically interlock with plastic or other elastomeric materials used to make an outer jacket. The preferably circumferential annular grooves on the inner liner are spaced from each other by a distance or distances selected not only for the mechanical interlocking of the layers, but also for the degree of flexibility requirements of the hose. The focus of the invention is primarily upon these grooves on the inner liner and the mechanical locking which they provide between the liner and the jacket.

A preferred embodiment of the invention is shown in the attached drawings, in which.

Figure 1:
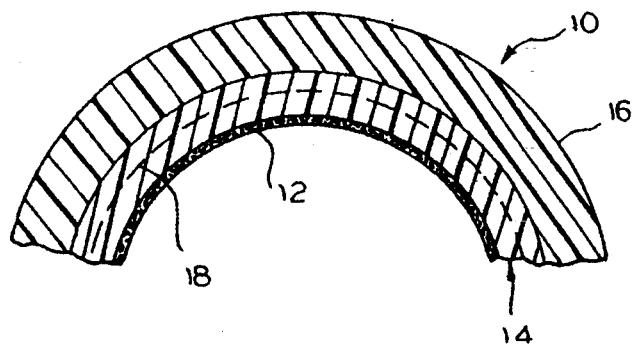
FIG. 1 is a fragmentary showing of a circumferential cross section of the inventive hose.

The inventive hose 10 (FIG. 1) has an electrically conductive inside layer 12, an extruded inner liner 14, and an extruded outer layer or jacket 16. All three layers 12, 14 and 16 are made of plastic or elastomeric material such as fluorocarbon. When the outer layer is made of PTFE, it may have a thickness in the order of 0.25 to 1.5 mm, with a preferred range of 0.4-0.9 mm. If the outer jacket is made of Nylon, the thickness may be in the range of 0.020-1.00 mm. A dashed line 18 indicates the bottom of grooves that are formed in the inner liner 14.

The electrical liner 12 may be made according to the teachings of U.S. Pat. No. 3,166,688. Since all three of the layers 12, 14, 16 are preferably made of the same kind of material (e.g. a fluorocarbon), they are compatible so that they may be chemically bonded to each other. However, the invention does not normally require any adhesive or bonding between layers.

Figure 2:
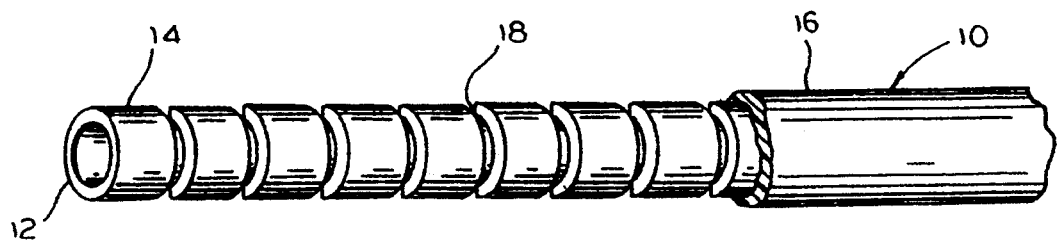
FIG. 2 is a perspective view of a hose with the outer jacket broken away to show the construction of the grooved liner.
Figure 6:
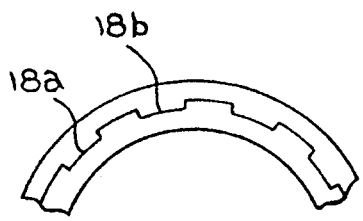
FIG. 6 shows an intermittent groove.

FIG. 2 shows the mechanical construction of the inventive hose 10. The liner 14 is extruded and formed with annular or circumferential grooves 18 distributed along the length thereof. These grooves may be either continuous 18 (FIG. 1) or intermittent (18a, 18b . . . (FIG. 6) around the circumference of the hose. Generally, the grooves are uniformly distributed along the length of the tube because most hoses should have a uniform flexibility throughout.

However, it is also within the scope of the invention to have the grooves closer to each other in some areas and further apart in other areas. As the grooves are located closer together, the hose becomes more flexible. As the grooves are located further apart, the hose becomes less flexible.

Figure 4:
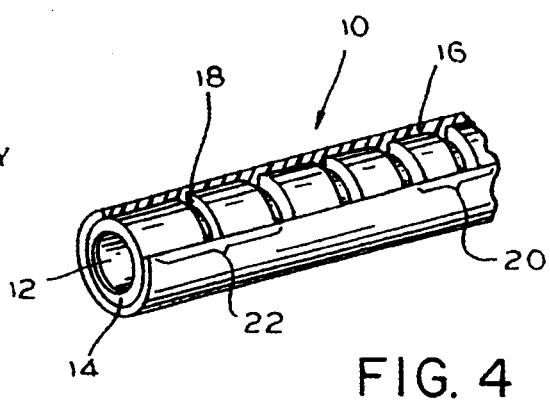
FIG. 4 is another perspective view with the outer hose jacket partially broken away in order to show the construction of a hose having different degrees of flexibility distributed along the length thereof.

More particularly, there are some hoses which should be relatively stiff near their ends and relatively flexible away from their ends; therefore, as shown in FIG. 4, the grooves at 22 are relatively far apart near the end and relatively close together at a location 20 which is away from the ends so that stress relief is provided at or near the end fittings. An example of such a hose is one (such as a brake fluid line) which whips about as the vehicle is in motion.

A grooved hose of the described type might be especially subject to kinking at the grooves. Therefore, it is desirable to provide an outer jacket or layer which fills the grooves and resists kinking. The outer jacket or layer 16 may be made as thick or as thin as necessary in order to make the hose strong enough to perform any desired function. However, for most automotive uses, a preferred range of outer jacket or layer thickness is approximately 0.25 mm to 1.5 mm. Also, the particular material used for the outer jacket is selected on a basis of such things as abrasion resistance, immunity to environmental hazards, and the like. Other thicknesses and materials may be used on hoses for other applications.

The method of manufacturer is to first extrude the inner liner 18, complete with the internal electrically conductive inner layer 12. In another manufacturing step, the grooves 18 are formed by either a material removal or displacement with either a uniform or a random spacing or with a combination of uniform and random spacing. At its end, the spacing between the hose grooves depends somewhat upon the length of the end fitting or the end stresses. A third manufacturing step causes the inner hose 14 to move through an extruder so that the fluorocarbon outer layer 16 material flows into and completely fills the grooves in order to form a mechanical interlock connection or bonding between layers 14, 16.

The temperature and pressure process parameters depend upon the specific materials that are selected; however, in general the processing temperature for extruding the outer jacket 16 is lower than the temperature for extruding the liner 14.

All layers are preferably made of fluorocarbon so that a non-mechanical (e.g. purely chemical) bonding would probably fail, either at the time of manufacture or later during operation. Or, in the alternative, if a chemical or similar bonding could be achieved in some cases, the process would likely be very costly.

The advantage of the grooves, as compared to other surface irregularities is that the annular grooves may be shaped and spaced to achieve desired results, especially in the area requiring kink resistance. Another advantage of the use of grooves is that there is a corrugated outer wall and a smooth inner wall giving the desirable features of a convoluted hose without the disadvantages of internal flow interruptions and turbulence resulting from the internal convolutions.

Figure 3:
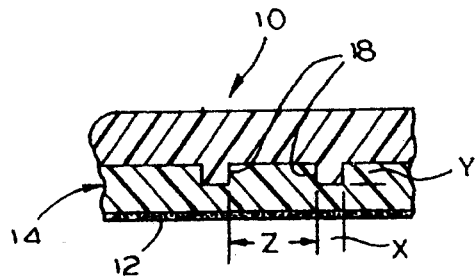
FIG. 3 is a longitudinal cross sectional showing of the inventive hose.

FIG. 4 shows the inventive hose and FIG. 3 is an enlarged showing of a portion of FIG. 4. The grooves are identified as having three sides of a rectangular cross section having a width "X" and a depth "Y". In a preferred embodiment, the "X" or width dimension is 0.13 mm to 0.7 mm and the "Y" or depth dimension is 0.13 mm to 1.0 mm. The inner groove spacing "Z" is determined empirically for each hose type depending upon the desired degree of flexibility.

Figures 5A, 5B, 5C, 5D, 5E:
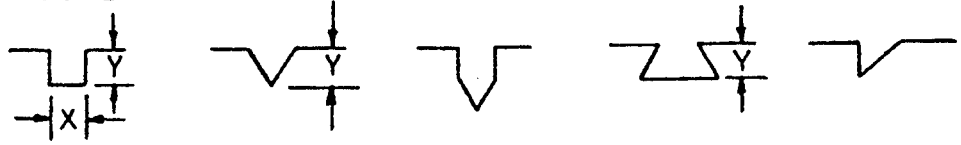
FIGS. 5A-5E show alternative cross sections for the locking groove which provide different flexibility to the inventive hose.

The grooves may be given special cross sectional shapes to provide special effects. For example, FIG. 5A shows three sides of a rectangular groove which gives a uniform response regardless of the manner in which the hose is bent. In FIG. 5B, the groove has two sides of a triangular cross section so that the inner and outer jackets normally rest in a predetermined position. As the hose bends, the triangular tooth on the outer jacket has to climb up the inclined side of the two sides of the triangular groove, thereby introducing a resistance to bending which becomes progressively greater as the radius of hose bending increases. In FIG. 5C, the groove has a cross section which begins with two spaced parallel sides and ends with an acute angle at the root of the groove, to give an effect which is a combination of the effects of FIGS. 5A, 5B. In FIG. 5D, the groove has a mortise or a dovetail joint, which should make the hose most resistant to bending. In FIG. 5E, the groove has a cross section which are two sides of a right triangle. When the bending of the hose presses together the perpendicular walls of the outer jacket tooth and inner liner groove, there is a resistance to bending. When the inclined planes of tooth and groove bear against each other, there is a progressively greater resistance to bending.

Those who are skilled in the art will readily perceive many modifications which may be made to the described structure. Therefore, the appended claims are to be construed to cover all equivalent structures falling within the scope and the spirit of the invention.

The claimed invention is:

1. A hose comprising an elastomeric inner liner having an electrically conductive inner surface and a plurality of circumferential grooves distributed along a length of the outer surface thereof, said grooves being further apart near the end of the hose to provide stress relief and closer together away from the end in order to provide flexibility, an elastomeric outer jacket extruded over the outer surface of the inner liner, the elastomeric material of said outer jacket flowing into said grooves in order to form a mechanical interlock between said inner liner and said outer jacket.

2. The hose of claim 1 wherein each of said inner liner, outer jacket, and conductive surface is made of a fluorocarbon material.

3. The hose of claim 1 wherein said inner liner is a fluorocarbon material.

4. The hose of claim 1 wherein said outer jacket is a fluorocarbon.

5. A hose for carrying corrosive fluids in an environment of vibration, swinging or whipping mechanical movement, said hose comprising a fluorocarbon inner hose having a plurality of grooves formed on the outer surface thereof whereby said grooves form areas of possible kinking, said grooves being spaced from each other by a distance selected to control the flexibility of the hose, said grooves being further apart near the ends of the hose than away from the ends of said hose in order to provide stress relief, and an elastomeric outer jacket formed over said hose and locking into said grooves to prevent said possible kinking, the elastomeric material of said outer jacket flowing into and substantially filling said grooves, whereby a mechanical interlock is formed between said inner hose and said outer jacket, and an electrically conductive inner surface in said inner hose.

6. The hose of claim 5 wherein said grooves have a cross section taken from a group consisting of three sides of a rectangle, two sides of a triangle, a spaced parallel pair of lines having an acute angle at the root of the groove, a dovetail mortise, and a ratchet groove.

* * * * *